US012187008B2

(12) United States Patent
Trani et al.

(10) Patent No.: US 12,187,008 B2
(45) Date of Patent: Jan. 7, 2025

(54) PROCESS FOR MAKING A CONTINUOUS LAYER OF AT LEAST A METALLIC FOIL OF THE FAMILY GROUP OF MALLEABLE/DUCTILE METALLIC MATERIALS AND AN APPARATUS TO CARRY OUT THE PROCESS

(71) Applicant: Giorgio Trani, Venice (IT)

(72) Inventors: Giorgio Trani, Venice (IT); Marion Sterner, Venice (IT); Federico Cariolaro, Vicenza (IT)

(73) Assignee: Giorgio Trani, Venice (IT)

(*) Notice: Subject to any disclaimer, the term of this patent is extended or adjusted under 35 U.S.C. 154(b) by 473 days.

(21) Appl. No.: 17/599,610

(22) PCT Filed: Mar. 27, 2020

(86) PCT No.: PCT/IB2020/052942
§ 371 (c)(1),
(2) Date: Sep. 29, 2021

(87) PCT Pub. No.: WO2020/201960
PCT Pub. Date: Oct. 8, 2020

(65) Prior Publication Data
US 2022/0184922 A1 Jun. 16, 2022

(30) Foreign Application Priority Data
Apr. 2, 2019 (IT) .......................... 102019000004909

(51) Int. Cl.
B32B 15/01 (2006.01)
B32B 3/30 (2006.01)
(Continued)

(52) U.S. Cl.
CPC ................. *B32B 15/01* (2013.01); *B32B 3/30* (2013.01); *B32B 15/095* (2013.01); *B32B 15/12* (2013.01);
(Continued)

(58) Field of Classification Search
CPC .......... B21D 43/08; B21D 1/05; B21C 37/02; B21B 1/22–466; B21B 13/02–2013/028;
(Continued)

(56) References Cited

U.S. PATENT DOCUMENTS 3,660,200 A * 5/1972 Anderson ............. D06M 17/06
156/278
4,605,458 A * 8/1986 Nakamura ............. B23K 20/04
156/324
(Continued)

FOREIGN PATENT DOCUMENTS

GB          2325244 A      11/1998
WO    2012146654 A1       11/2012

*Primary Examiner* — Carson Gross
(74) *Attorney, Agent, or Firm* — Carmel Patent Agency; Robert Ballarini

(57) ABSTRACT

A procedure is presented for making a continuous tape of at least one metallic material of malleable/ductile metallic materials. The process includes passing a continuous strip of the metallic material between a rigid cylinder and a presser in elastically compressible material, held adherent to the rigid cylinder and at the same time subjecting the continuous tape, in at least a portion of its passage between the rigid roller and the presser and a reduction in the speed of its surface in contact with the presser with respect to the speed of its surface in contact with the rigid cylinder the surfaces of the outgoing tape being always parallel to each other and the final width of the tape corresponding to the initial width.

5 Claims, 2 Drawing Sheets

(51) Int. Cl.
*B32B 15/095* (2006.01)
*B32B 15/12* (2006.01)
*B32B 15/20* (2006.01)
*B32B 37/00* (2006.01)
*B32B 38/00* (2006.01)
*B32B 38/18* (2006.01)

(52) U.S. Cl.
CPC .......... *B32B 15/20* (2013.01); *B32B 37/0053* (2013.01); *B32B 2038/0028* (2013.01); *B32B 38/1825* (2013.01); *B32B 2307/51* (2013.01); *B32B 2307/732* (2013.01)

(58) Field of Classification Search
CPC ............ B32B 37/0053; B32B 38/1825; B32B 2038/0028
See application file for complete search history.

(56) References Cited

U.S. PATENT DOCUMENTS

| | | |
|---|---|---|
| 6,024,832 A | 2/2000 | Trani et al. |
| 2015/0360268 A1* | 12/2015 | Zhou .................. H01M 4/0435 72/252.5 |

* cited by examiner

PROCESS FOR MAKING A CONTINUOUS LAYER OF AT LEAST A METALLIC FOIL OF THE FAMILY GROUP OF MALLEABLE/DUCTILE METALLIC MATERIALS AND AN APPARATUS TO CARRY OUT THE PROCESS

FIELD OF THE INVENTION

The present invention relates to a process for making a continuous tape of at least one metallic material from the family of malleable/ductile metal materials for making an extensible metal belt and an apparatus for carrying out the process.

BACKGROUND

The lengthening of the metal tapes is a required feature also in the thermoformed packaging fields where for example aluminum tapes are associated with at least one polymer layer and this in order to be able to weld the three-dimensionally deformed and filled package (e.g. pharmaceutical blisters). In this case the deformability of the aluminum layer occurs through its thinning.

The embossing technique that involves making micro and macro padding on metal tapes is also known. The padded areas become thinner and the relative tapes are less rigid, more adaptable for wrapping etc. but they do not stretch.

This known process has the drawback of a thinning of the metal layer during its deformation, both by thermoforming and by padding/embossing and therefore the possibility of creating micro-holes, which decrease the protective properties of the metal. In any case, high thicknesses present high costs.

SUMMARY

The object of the present invention is to eliminate the drawbacks of the prior art and to make continuous metal tapes extensible at least longitudinally with reduced starting thicknesses and improved characteristics.

This object is achieved according to the invention with a process and an apparatus for carrying out the method as described in the appended claims.

BRIEF DESCRIPTION OF THE DRAWINGS

The present invention is further clarified below through some of its preferred embodiments with reference to the attached drawings, wherein.

DETAILED DESCRIPTION OF THE PREFERRED EMBODIMENTS

Figure 1:
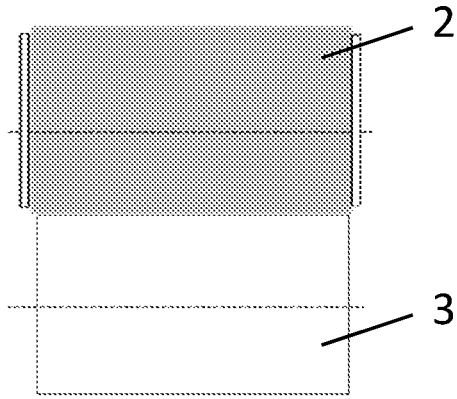
FIG. 1 shows a schematic front view of an apparatus for carrying out the process according to the invention to produce a ductile/malleable metal tape or an extendable multilayer thereof.
Figure 2:
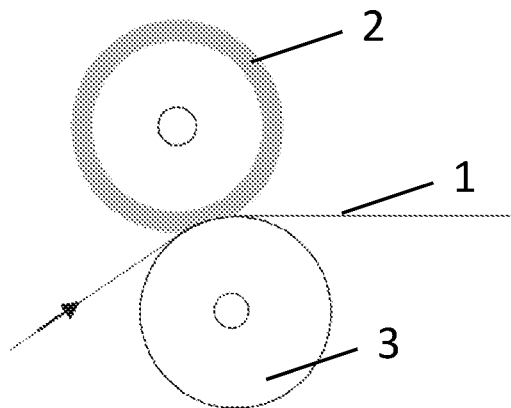
FIG. 2 shows it in side view.
Figure 3:
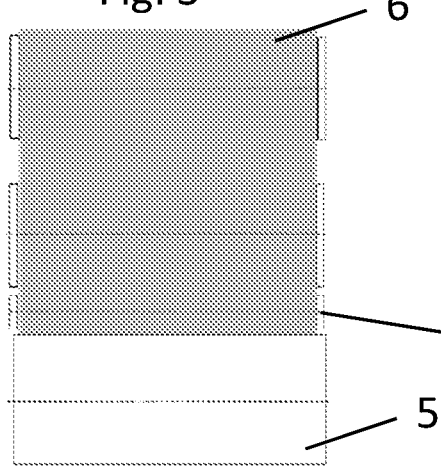
FIG. 3 is a schematic front view of a second apparatus.
Figure 4:
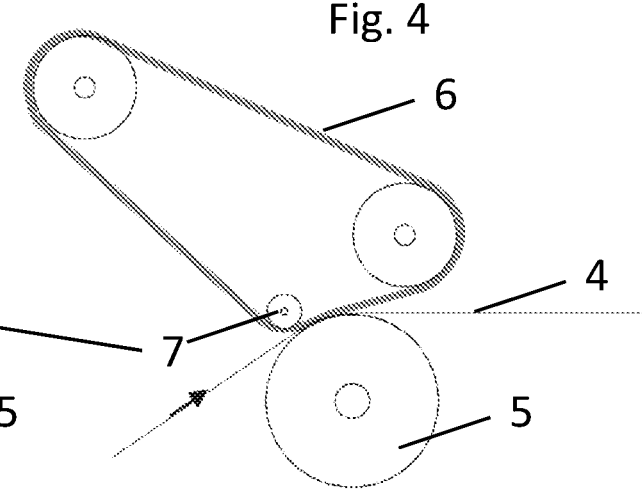
FIG. 4 is a side view of it.
Figure 5:
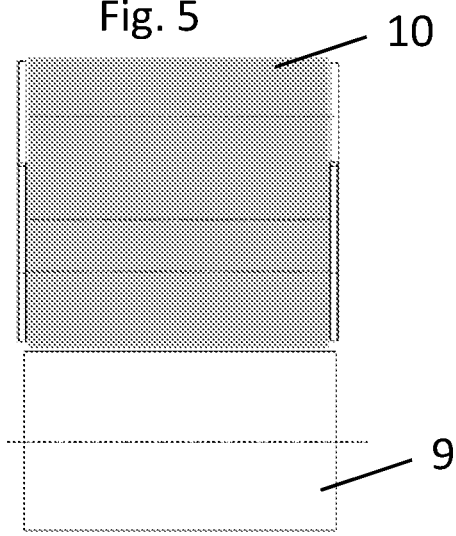
FIG. 5 shows a schematic front view of a third apparatus.
Figure 6:
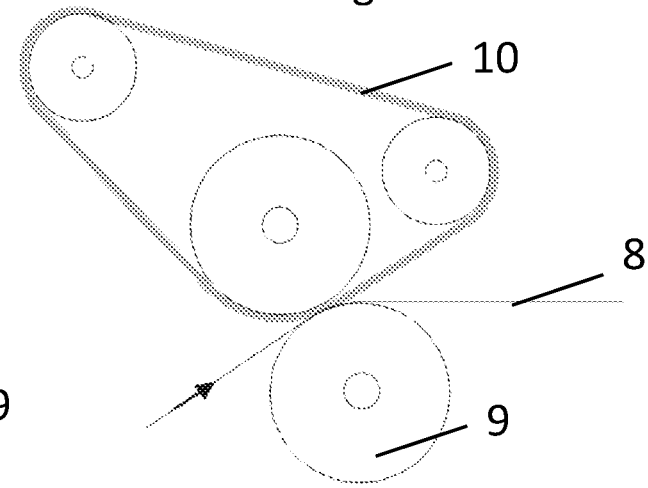
FIG. 6 is a side view of it.
Figure 7:
FIG. 7 shows a metal tape 11 obtained with the process according to the invention, FIG. 8 a metal tape 11 with a binder 12 and with a second metal tape 11, FIG. 9 a metal tape 11 with a binder 12 and with a paper tape 13, FIG. 10 a metal tape 11 in the middle of two paper tapes 13, held together by a binder 12, FIG. 11 a metal tape 11 with a binder 12 and with a polymer tape 14, FIG. 12 a metal tape 11 in the middle of two polymeric tapes 14, held together by a binder 12, FIG. 13 a metal tape 11 in the middle of a paper tape 13 and a polymeric tape 14, held together by a binder 12, FIG. 14 a metal tape 11 in the middle of another metal tape 11 and a polymeric tape 14, held together by a binder 12, FIG. 15 a metal tape 11 associated with another tape 15, such as metallic, paper, polymeric or other, without a binder.
Figure 8:
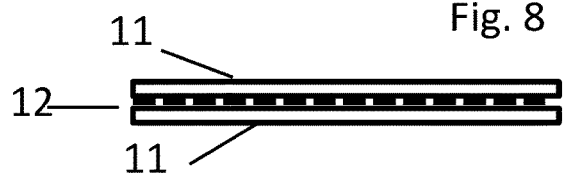
Figure 9:
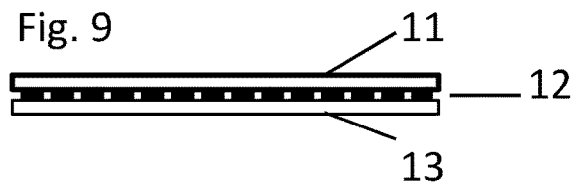
Figure 10:
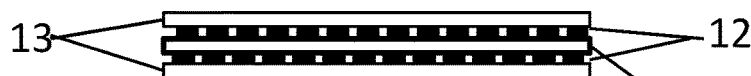
Figure 11:
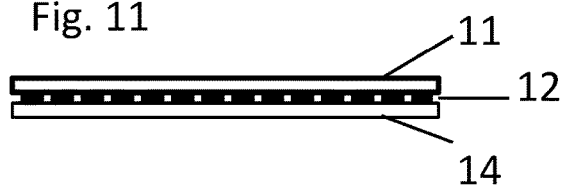
Figure 12:
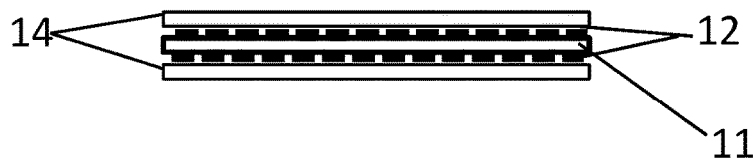
Figure 13:
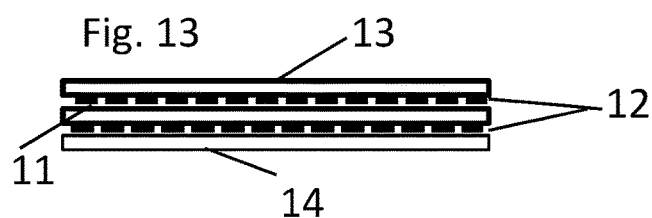
Figure 14:
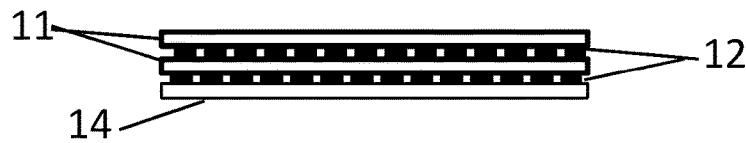
Figure 15:
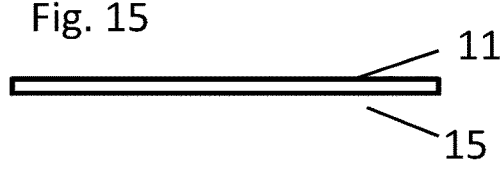
Figure 16:
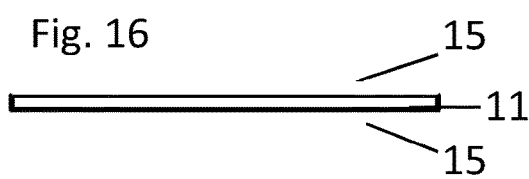
FIG. 16 shows a metallic tape 11 associated with two other tapes (layers) 15, such as metallic or paper or polymeric or other, without a binder.

In particular, the process according to the invention substantially uses, in a first embodiment, a pair of forming cylinders of which the lower cylinder 3 is made of rigid material, preferably of steel, while the upper cylinder 2 is made of elastically compressible material, for example in rubber or also in steel but with an external rubber coating.

Both cylinders are supported by a suitable structure and are associated with respective motors, which drag them in rotation in opposite directions at different peripheral speeds and more precisely at speeds V1 for the lower steel cylinder 3 and at speeds V2<V1 for the rubberized upper cylinder 2.

The upper cylinder 2 and the lower cylinder 3 preferably have approximately the same diameter and the rubber of the upper cylinder has a substantially smooth surface and hardness advantageously comprised between 60 and 240 PJ and preferably between 120 and 220 PJ.

The apparatus described above works as follows: when a continuous ductile/malleable metal belt 1 or a multilayer 4 or 8 thereof, is passed between the two cylinders, the combined effect of the appropriate pressure (based on the thickness of the metal tapes to be treated) existing in their contact area (nip), and at different speeds, causes the rubberized cylinder 2 to press the metal tape 1 or 4 or 8 against the lower metal cylinder 3 to an extent suitable for carrying the metal tape to be treated to create transversal micro—compactions that give this metal tape an elongation in the machine direction.

When an elongation in the transverse direction, as well as an elongation in the machine direction, is desired, then a metal cylinder with grooves is used. In this case, the combined effect of the different speed between the metal cylinder and the rubberized cylinder under a suitable pressure, leads to adhere the metal tape to be treated to the bottom of the grooves, causing a transfer of energy from the rubber cylinder to the metal tape to be treated in size sufficient to compact it not only in the machine direction but also to create an accumulation of material in the transverse direction, obtaining an elongation in both directions. The difference in speed of the two rollers has this double effect.

On the one hand it determines a longitudinal compaction which on the other side is immediately used to obtain a greater transversal development which in turn allows to obtain the transverse elongation without reducing the width of the outgoing tape.

In another embodiment, the circumferentially grooved lower cylinder cooperates with a continuous belt of elastically compressible material instead of a cylinder of elastically compressible material. The elastically compressible belt is stretched between a series of deflection rollers, of which at least one is motorized, and advances, as in the case of the previous embodiment, at a peripheral speed V2<V1. More particularly, the elastically compressible belt is stretched between a first roller, which presses it against the steel cylinder, a second cylinder and a third roller.

Also in this case, the equipment works as in the previous case, in the sense that the lower peripheral speed V2 of the rubber tape with respect to the peripheral speed V1 of the steel cylinder causes a braking effect on the ductile/malleable metal tape or its multilayer interposed between the two, which combined with the pressure exerted by the belt itself on the metal tape, in addition to pressing it on the bottom of the circumferential grooves of the cylinder, for creating an elongation in the transverse direction, together with a series of transversal micro-ruffles that serve to elongate in the longitudinal direction.

In a further embodiment, the steel cylinder is associated, as in the case of the previous embodiment, with a belt, made of elastically compressible material and stretched between three or more deflection rollers. One of these, which could also be replaced by a fixed return bar, has a significantly smaller diameter than the diameter of the steel cylinder and is positioned and configured so as to locally press the elastically compressible belt itself against said cylinder in order to significantly reduce its the thickness and to increase locally, consequently, the peripheral speed in the short area of contact with the cylinder.

The various sizes involved are sized so that the speed of the elastically compressible belt at the point of passage between the cylinder or bar and the steel cylinder is equal to the peripheral speed V1 of said cylinder.

As soon as the elastically compressible belt has left the passage delimited by the bar and the cylinder it elastically recovers its original thickness, with a sharp increase in thickness and a consequent sharp decrease in speed, which causes a sort of slowdown of the metal/multilayer tape to be treated, which the belt contacts and with the formation of transversal micro-ruffles in a manner similar to that already described in the two previous examples, resulting in a treated metal tape.

If also in this case it is desired to obtain a metal tape which can be extended not only in the machine direction but also in the transverse direction, the steel cylinder is affected by grooves, which always cause an elongation also in the transverse direction in a similar way as previously described.

In general, these grooves can have a circumferential development; they can be continuous or discontinuous. The dimensions of the grooves can also vary a lot, depending on the degree of transverse elongation to be obtained on the metal or multilayer tape according to market requirements. They can have depths between 0.01 mm and 4 mm, preferably between 0.05 mm and 0.5 mm; width between 0.01 mm and 4 mm, preferably between 0.05 mm and 0.09 mm; and pitch between 0.01 and 10 mm.

In the case of spiral incisions 4, the angle of inclination of the spiral can be between a minimum value, allowed by the width of the incision, to a maximum value of 45°, even if it is preferable that it is between 5° and 15°; it can also be the same for the entire axial length of the cylinder 2 or it can be opposite the two halves of the cylinder itself. In all the examples described it was found that, once the elongation imparted was extended, both in the machine direction and/or also in the transverse direction, the treated metal sheet, and also the multilayer (with paper, and/or plastic film and/or multiples) and returned to its original dimensions in the machine direction, and in elongation exceeded the original size in the transverse direction.

In general, the cylinder in rigid material, with or without grooves, can be chromed or coated with other materials such as ceramic, Teflon etc. It can be operated cold or can be heated.

Metal tapes are for example: gold, silver, platinum, palladium, iron, nickel, copper, aluminum, zinc, tin, lead and their alloys. It also means other metal tapes which, due to their reduced thickness, become malleable/flexible, such as metallizations on various supports.

With "composite" or "multiple layers" said ductile/malleable metal tapes associated with paper, polymeric film tapes is meant or other ductile/malleable metal tapes or in turn multiples thereof. Water-based glues, solvent-based adhesives or polymeric films which are applied by coextrusion or coupling between these tapes can be used as binders between these tapes. All these binders are part of the prior art and are not further described here. It is also possible to treat these composite or multiple layers according to the process of the present invention without the use of binders between them.

If these metal tapes are associated with layers that require particular malleability in order to carry out the treatment together with the metal layers, any paper layers can previously undergo humidification of up to 60%-85% dry, and polymeric layers can undergo respectively preheating according to their characteristics. In the same way it is foreseen that, after the treatment, the paper layers are subjected to drying, and the polymeric layers to cool respectively.

It is understood that said single metal tapes, their alloys or the related multilayers can, once treated, be associated with further layers with known techniques such as gluing, coupling, etc.

The results of tests carried out are listed below an aluminum tape 1 with an initial thickness of 18 microns has been inserted in an apparatus wherein a rubber cylinder 2 in contact with a rigid cylinder 3 has been subjected to a speed reduction of 5%. The tape thus treated could be re-stretched by 5%, an aluminum tape 4 with a thickness of 6.35 microns on which a 20 micron layer of polythene had been applied was inserted in an apparatus wherein a metal cylinder 5 associated therewith, a belt 6, made of material elastically compressible stretched between three or more deflection rollers. One of these has been replaced by a fixed return bar 7, has a significantly smaller diameter than the diameter of the cylinder 5 and is positioned and configured so as to locally press the elastically compressible belt 6 itself against said cylinder 5 so as to significantly reduce its thickness and to increase locally, consequently, the peripheral speed in the short area of contact with the cylinder 5.

The various sizes involved are sized so that the speed of the metal tape associated with polythene 4 at the point of passage between the cylinder or bar 7 and the cylinder 5 is equal to the peripheral speed V1 of the lower cylinder 5.

As soon as the elastically compressible belt 6 has left the passage delimited by the bar 7 and the cylinder 5, it elastically recovers its original thickness, with a sharp increase in thickness and a consequent sharp decrease in speed, which causes a sort of slowing down of the aluminum associated with the polythene layer 4, which it contacts and with the formation of transversal micro-ruffles in a manner similar to that already described above in the previous example. The aluminum tape associated with the polythene layer thus treated had an elongation of 15%, an 18 micron thick aluminum tape has been associated with a 18 g/m2 paper layer 8. This multilayer 8 has been inserted in a device wherein a circumferentially micro-grooved cylinder 9 (micro-grooves not shown) which cooperates with a continuous belt 10 of elastically compressible material. The belt 10 is stretched between a series of deflection rollers, at least one of which is motorized, and is driven at a peripheral speed V2<V1. More particularly, the elastically compressible belt 10 is stretched between a first roller, which presses it against the cylinder 9, and two deflection rollers.

Also in this case the lower peripheral speed V2 of the tape of elastically compressible material 10 with respect to the peripheral speed V1 of the cylinder 9 causes a braking effect on the multilayer tape to be treated 8 interposed between the two, which combined with the pressure exerted by the tape 10 on the multilayer belt 8, in addition to pressing it on the bottom of the circumferential micro-grooves of the cylinder 9, for creating an accumulation not only in the longitudinal direction but also in the transverse direction. This effect results in a longitudinal elongation of 20% and in a transverse elongation of 10% of the treated multilayer.

A 25 micron thick gold tape has been associated with two sheets of paper (moistened to a dryness of 65%) below and above without the use of binders and has been subjected to the procedure as described in the example c. Also in this case, a longitudinal elongation of 20% and a transverse elongation of 10% was obtained. Furthermore, the multilayer was then subjected to a traditional drying process to bring both paper sides to a dry state. In addition to the elongations achieved, an excellent adhesion of all the tapes making up the multilayer could also be observed.

An aluminum tape with a thickness of 14 microns has been associated with a sheet of paper (humidified to a dry degree of 70%) without the use of binders and has been subjected to the procedure as described in example c). Also in this case, a longitudinal elongation of 20% and a transverse elongation of 10% have been obtained. In this example the paper must only act as an aid during the treatment of the aluminum tape and therefore both layers are separated directly after said treatment with traditional techniques, and are conveyed separately to further processes such as winding, possible drying of the paper etc.

A 9 micron thick copper tape has been associated with a layer of TPU (a polyurethane-based material used in the electronics world). The multilayer was subjected to the procedure described in example a) with the difference that the metal cylinder was provided with circumferential grooves. This time the difference in speed between the metal cylinder with the grooves and the rubber cylinder was 20%. The multilayer treated in this way could extend in the machine direction by 20% and in the transverse direction by 15%.

Due to what has been described, it is clear that the process and the apparatus according to the invention allow to obtain a regular micro-constipation in the transverse direction of the belt, which gives it elongation in the machine direction, and, if circumferential grooves are present on said metal cylinder, the accumulation of material that is created through the difference in speed between said rigid cylinder and the pressure element, allows to obtain an elongation of the material also in the transverse direction with respect to the machine direction.

The procedure can be performed only once on a material (single or multilayer), but it can also be repeated several times.

If the metal layer is associated with a second or third layer, this layer, for example paper, is humidified to a dry content due to its malleability. If this second or third layer is a polymer, this polymer is brought to its moldability by means of a preheating specific to the type of polymer.

Sectors in which, for example, these layers can find applications are packaging (pharmaceutical and non-pharmaceutical), both thermoformed and non-thermoformed, the electronics and construction fields, furniture, automotive, etc.

The invention claimed is:

1. A process for making a continuous tape of at least one metallic material from malleable metallic materials, the process comprising:
    passing a continuous tape (1), having an initial width and having a thickness between 6.35 and 25 microns, of said at least one metallic material between a rigid cylinder (3) and a presser (2) made of elastically compressible material, kept adherent to said rigid cylinder and at the same time subjecting said continuous tape, in at least a portion of its passage between said rigid cylinder and said presser to a speed reduction of its surface in contact with said presser (21) with respect to the speed of its surface in contact with said rigid cylinder (3) the surfaces of the outgoing belt tape being always parallel to each other, wherein after said passage, the tape is extendible in the longitudinal direction between 5% and 20% and wherein a final width of the tape corresponds to the initial width.

2. The process according to claim 1, wherein a second malleable tape is combined with the continuous tape of at least one metallic material of malleable metallic materials.

3. The process according to claim 1, wherein a further malleable tape is combined with said metal tape.

4. The process according to claim 1 wherein the rigid cylinder (3) comprises on a lateral surface thereof circumferential side by side grooves, and wherein said presser (2) of elastically compressible material is pressed against said rigid cylinder with a force suitable to make said continuous tape (1) penetrate into said grooves.

5. The process according to claim 4, wherein the rigid cylinder (3) used comprises grooves having a depth of between 0.01 mm and 4 mm; a width between 0.01 mm and 4 mm; and a pitch between 0.01 and 10 mm.

\* \* \* \* \*